US012228406B2

(12) United States Patent
Pratt et al.

(10) Patent No.: US 12,228,406 B2
(45) Date of Patent: Feb. 18, 2025

(54) MULTI-AGENT NAVIGATION

(71) Applicant: SB Technology, Inc., Tarrytown, NY (US)

(72) Inventors: Ethan Jesse Pratt, Santa Clara, CA (US); Kyle Austin Palko, Cambridge, MA (US)

(73) Assignee: SB Technology, Inc., Tarrytown, NY (US)

( * ) Notice: Subject to any disclaimer, the term of this patent is extended or adjusted under 35 U.S.C. 154(b) by 0 days.

(21) Appl. No.: 18/204,313

(22) Filed: May 31, 2023

(65) Prior Publication Data

US 2024/0401952 A1    Dec. 5, 2024

(51) Int. Cl.
*G01C 21/00* (2006.01)
*G01C 21/20* (2006.01)

(52) U.S. Cl.
CPC .......... *G01C 21/005* (2013.01); *G01C 21/20* (2013.01)

(58) Field of Classification Search
CPC ...... G01C 21/005; G01C 21/20; G01C 21/08; G05D 1/104
See application file for complete search history.

(56) References Cited

U.S. PATENT DOCUMENTS

| 10,620,296 | B1 | 4/2020 | Ezal et al. | |
| 2014/0163775 | A1* | 6/2014 | Metzler | B64C 19/00 |
| | | | | 701/2 |
| 2015/0301529 | A1* | 10/2015 | Pillai | G08G 5/0026 |
| | | | | 701/2 |
| 2016/0378109 | A1* | 12/2016 | Raffa | G08G 5/0043 |
| | | | | 701/2 |
| 2022/0136832 | A1* | 5/2022 | Berkovich | H04W 4/029 |
| | | | | 701/446 |
| 2023/0081963 | A1* | 3/2023 | James | G05D 1/104 |
| | | | | 701/2 |

FOREIGN PATENT DOCUMENTS

| CN | 113132425 A | * | 7/2021 | ............... G08G 1/20 |
| EP | 4123619 A1 | * | 1/2023 | ............ B60W 30/165 |
| JP | 2019175089 A | * | 10/2019 | |

OTHER PUBLICATIONS

"Yang, et al., Cooperative Navigation Using Pairwise Communication with Ranging and Magnetic Anomaly Measurements, 2020" (Year: 2020).*

(Continued)

*Primary Examiner* — Sahar Motazedi
(74) *Attorney, Agent, or Firm* — Fish & Richardson P.C.

(57) ABSTRACT

Example computer-implemented methods and systems for anomaly-sensing based multi-agent navigation are disclosed. One example computer-implemented method includes: receiving relative distance data specifying distance between at least one pair of agents of a plurality of agents, each of a subset of the plurality of agents having an anomaly sensor subsystem; receiving anomaly data from at least one anomaly sensor subsystem of one of the plurality of agents; obtaining pre-surveyed map data; and determining global pose data of the plurality of agents based on the relative distance data and based on comparing the anomaly data to the pre-surveyed map data.

18 Claims, 12 Drawing Sheets

(56) References Cited

OTHER PUBLICATIONS

"Goldenberg, Geomagnetic Navigation beyond the Magnetic Compass, 2006" (Year: 2006).*
"Canciani, et al., Positioning Using Magnetic Fields, 2021" (Year: 2021).*
Machine Translation of JP-2019175089-A (Year: 2019).*
Machine Translation of CN-113132425-A (Year: 2021).*
Badea et al., "Indoor navigation with pseudolites (fake GPS sat.)," Linkoping University Thesis, Jan. 27, 2005, ISRN LITH-ITN-ED-EX-05/001-SE, 120 pages.
Canciani, "Absolute Positioning Using the Earth's Magnetic Anomaly Field," Theses and Dissertations, Sep. 15, 2016, retrieved from URL<https://scholar.afit.edu/etd/251>, 265 pages.
Gade, "The Seven Ways to Find Heading," The Journal of Navigation, Sep. 2016, 69(5): 955-970, 17 pages.
Grasso et al., "Distributed underwater glider network with consensus Kalman filter for environmental field estimation," Oceans 2015, May 2015, 10 pages.
La et al., "Cooperative and Active Sensing in Mobile Sensor Networks for Scalar Field Mapping, " IEEE Transactions on Systems, Man, and Cybernetics: Systems, Jan. 2015, 45(1): 1-12.
La et al., "Distributed Sensor Fusion for Scalar Field Mapping Using Mobile Sensor Networks," IEEE Transactions on Cybernetics, Apr. 2013, 43(2): 766-778, 13 pages.
Lee et al., "MagSLAM: Aerial Simultaneous Localization and Mapping using Earth's Magnetic Anomaly Field," Navigation, 2020, 67: 95-107, 14 pages.
Leliak, "Identification and Evaluation of Magnetic-Field Sources of Magnetic Airborne Detector Equipped Aircraft," IRE Transactions on Aerospace and Navigational Electronics, 1961, ANE-8(3), 95-105.
Lemaster, "Self-calibrating pseudolite arrays: Theory and experiment," ProQuest Dissertations and Theses, Stanford University PhD theses (63-04), Publication No. AAI3048566, May 2002, 188 pages.
Meyer et al., "EMAG2: Earth Magnetic Anomaly Grid (2-arc-minute resolution)," Poster, Version 3 NOAA National Centers for Environmental Information, 2017, retrieved Mar. 7, 2023, retrieved from URL<https://doi.org/10.7289/V5H70CVX>, 1 pages.
Rahmani et al., "Space vehicle swarm exploration missions: a study of key enabling technologies and gaps," 70th International Astronautical Congress, Oct. 2019, IAC-19-D1.2, 26 pages.
Vetrella et al., "Satellite and Vision-Aided Sensor Fusion for Cooperative Navigation of Unmanned Aircraft Swarms," Aerospace Research Central, Apr. 17, 2017, 14(6) (abstract only).
Yang et al., "Cooperative Navigation Using Pairwise Communication with Ranging and Magnetic Anomaly Measurements," Journal of Aerospace Information Systems, Nov. 2020, 17(11), 10 pages.
Yang et al., "Cooperative UAV Navigation using Inter-Vehicle Ranging and Magnetic Anomaly Measurements," AIAA SciTech Forum, Jan. 2018, 16 pages.
International Search Report and Written Opinion in International Appln. No. PCT/US2024/031286, mailed on Sep. 4, 2024, 17 pages.
Liu et al., "Pairwise control in swarm flocking with application to UAVs", Engineering Applications of Artificial Intelligence, Jun. 22, 2022, 114(105023):1-14.
Richeson, "Gravity Gradiometer Aided Inertial Navigation Within Non-GNSS Environments," Ion GNSS 20th International Technical Meeting of the Satellite Division, Sep. 25-28, 2007, 1089-1100.

* cited by examiner

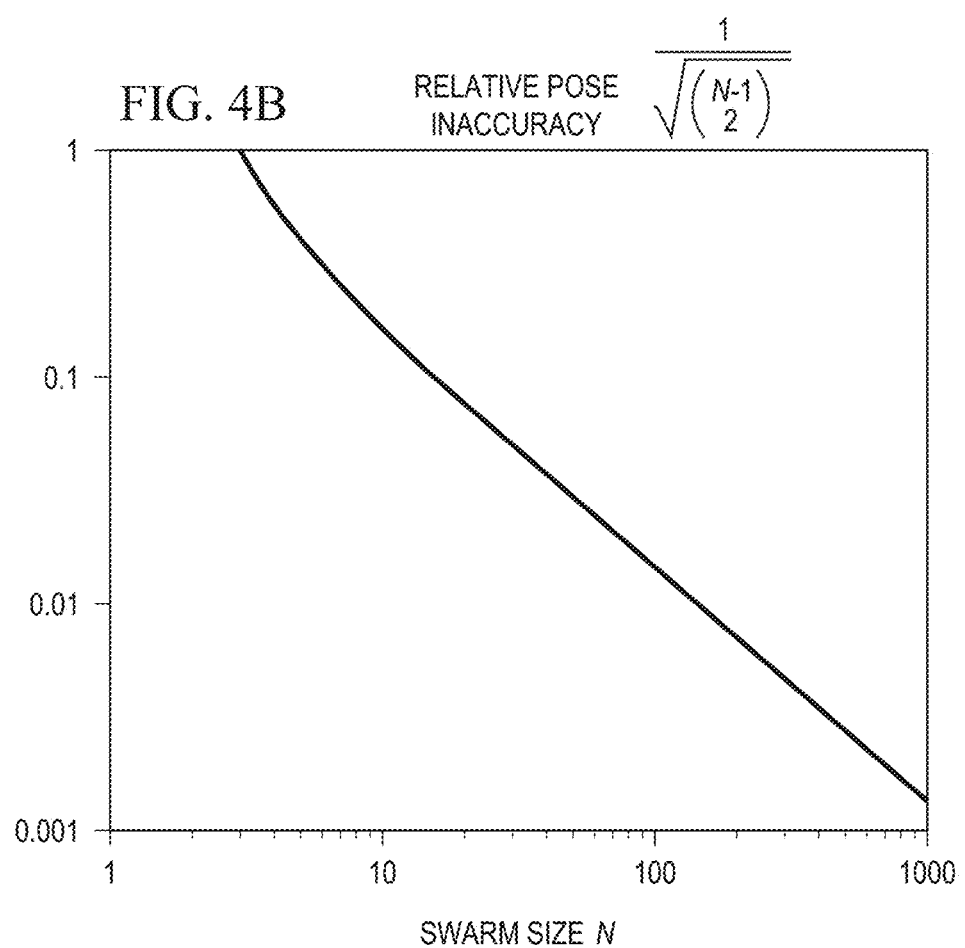

| Swarm agent type | Agent description | Sensing | | | | Processing | | | | Comms. | |
|---|---|---|---|---|---|---|---|---|---|---|---|
| | | Heading, attitude, & altitude | IMU | Relative pose | Anomaly field | Anomaly map storage | Nav. compute & terrain storage | Swarm almanac Storage | Swarm almanac Compute | Rx | Tx |
| Swarm prodigy | Equipped with all capabilities | ✓ | ✓ | ✓ | ✓ | ✓ | ✓ | ✓ | ✓ | ✓ | ✓ |
| ↳ Anomaly-aided pseudolite | Navigates and communicates | ✓ | ✓ | ✓ | | | | | | ✓ | ✓ |
| Navigation computer | Computes time-series of pose estimates | | | | | | ✓ | ✓ | ✓ | ✓ | ✓ |
| ↳ Sensor drone | Measures anomaly field along its course | | | | ✓ | | | | | | ✓ |
| Operations agent | Passive navigator receiving swarm pseudolite signals | | | ✓ | | | ✓ | ✓ | | ✓ | |

FIG. 10

MULTI-AGENT NAVIGATION

CROSS-REFERENCE TO RELATED APPLICATIONS

The present application is related to U.S. utility patent application, application Ser. No. 18/204,321, entitled "Differentiated Multi-Agent Navigation" filed on May 31, 2023, and listing Ethan Jesse Pratt and Luca Ferrara as inventors and which is incorporated herein by reference in its entirety.

TECHNICAL FIELD

The present disclosure relates to computer-implemented methods, media, and systems for multi-agent navigation.

BACKGROUND

Global Positioning System (GPS) based navigation uses a constellation of satellites orbiting Earth to provide a set of coordinated references for agents navigating below. However, in GPS-denied environments, GPS cannot be relied upon by agents for navigation.

SUMMARY

The present disclosure involves computer-implemented methods, media, and systems for multi-agent navigation. In general, one innovative aspect of the subject matter described in this specification can be embodied in methods that include the actions of: receiving relative distance data specifying distance between at least one pair of agents of a plurality of agents, each of a subset of the plurality of agents having an anomaly sensor subsystem; receiving anomaly data from at least one anomaly sensor subsystem of one of the plurality of agents; obtaining pre-surveyed map data; and determining global pose data of the plurality of agents based on the relative distance data and based on comparing the anomaly data to the pre-surveyed map data.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Determining the global pose data of the plurality of agents can include determining, using the relative distance data, a relative position vector between two agents. Determining the global pose data of the plurality of agents can include determining a difference between the pre-surveyed map data and the anomaly data at a location of each of the plurality of agents. Determining the global pose data of the plurality of agents can include receiving heading and attitude data for a plurality of agents having anomaly sensor subsystems. Determining global pose data of the plurality of agents based on the relative distance data and based on comparing the anomaly data to the pre-surveyed map data can include determining positions that meet at least one joint constraint that each agent anomaly sensor measurement is true and that the relative distance or pose of the subset of the plurality of agents measuring anomalies is true. Receiving anomaly data can include receiving magnetic field anomaly data measured using at least one magnetometer. Receiving anomaly data can include receiving gravitational field anomaly data measured using at least one gravimeter or at least one gravity gradiometer. The relative distance data can be measured using a ranging device. The ranging device can be at least one LIDAR or at least one SONAR or at least one RADAR or at least one microwave ranging device or a combination of the above. The relative distance can be measured using time of flight analysis.

The method can further include taking an action based at least in part on the global pose data. Taking an action based at least in part on the global pose data can include providing navigation instructions to at least one agent based at least in part on the global pose data. The method can further include receiving inertial measurement data from an inertial measurement unit on at least one agent in the plurality of agents and performing dead reckoning based in part on the inertial measurement data. The method can further include receiving vector sensing data from at least one vector sensor on at least one agent.

The subject matter described in this specification can be implemented in particular embodiments so as to realize one or more of the following advantages. Collectively, embodiments described in this specification improve the absolute pose estimation of all agents in the dynamic swarm, compared to performance of the agents without network coordination. This improvement is achieved without relying on an external system such as landmark observations or GPS/GNSS. From their cooperative network, GPS-denied agents are now able to receive advantageous updates to estimates of their absolute pose on the map, with more accuracy than is accessible by any other means. Comparable accuracy is impossible to acquire by an independent agent or collection of non-networked agents.

Advantages of homogeneous swarms: The homogenous swarm type is advantageous because it confers maximal flexibility to mission planners, who may assign tasks to the swarm without concern for individual agent capabilities. When deploying subsets of a fleet as operational swarms, provisioning agents from a homogeneous fleet furthermore provides for maximum: task-assignment redundancy: any task may be attempted by any agent(s), and agent replacement capacity.

The homogeneous swarm is further advantageous because it can conduct autonomous flocking operations in GPS-denied areas. "Flocking" is used here to mean that the individual agent courses and specific objectives are not fully planned in advance, but are instead defined by cooperative updates during the operation. These updates include emergent information from trajectories of other agents in the swarm, as well as progress towards mission objectives and unforeseen impediments. (Note, "autonomous" here can mean, but does not necessarily mean, "unmanned." It simply refers to autonomy of the swarm with respect to central mission control. Central control equipment may be too distant, or lack sufficient communication bandwidth, to provide the necessary updates).

Flocking algorithms are naturally more efficient to compute for collective agents with identical capabilities. Therefore, a homogeneous swarm type enables higher-speed dynamics and larger flock numbers than a similarly-equipped swarm with differentiated agents.

When GPS is denied, anomaly-aided flocking networks are a useful improvement to the flocking SOTA by extension of this disclosure's thesis; namely that anomaly-aided networks are an improvement to unaided mobile network SOTA.

Advantages of the cloud-based navigation computer architecture: Some types of operating fleets—especially airborne and surface vessel military fleets—already employ large-SWaP+C mobile platforms, often considered "command and control" platforms. These could be readily retrofitted with substantial communication and computation equipment, to accommodate a swarm navigation computer with storage. This is the case even if these same platforms can not readily be (or do not need to be) retrofitted with anomaly sensing and/or dead-reckoning equipment. From the point of view of the agents, this would also appear to be a cloud computation architecture, just as in the case where the navigation computer is stationary. In fact, as a term of art, the airborne case may represent the ultimate use of "cloud computation."

Separating these functions from the in-swarm mobile agent platform provides utility via reduction of SWaP+C:

Storage requirements to accommodate highly-detailed, global-coverage anomaly maps are substantial. Such storage may need to also provision capacity for updates such as geomagnetic solar weather that varies meaningfully on intra-day timescales, and which are required for the most accurate calibrations of anomaly measurements.

Computation and storage requirements for the swarm almanac are also substantial. These are driven by requirements for sufficient computational speed and storage to compute anomaly-aided updates to each mobile agent's dead-reckoning navigation filter solution. This is an intensive task In near-real time, typically requiring dedicated hardware, such as GPUs. SLAM methods demand even more computational+ storage capacity.

Furthermore, displacing such equipment from the anomaly sensor platform offers reduced EMI—and reduced remnant signal artifacts—which tend to confound anomaly sensor measurements.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

FIG. 4B illustrates a square-root performance scaling model for relative pose inaccuracy, according to some implementations.

FIG. 10 illustrates example functions of agents in an anomaly-aided swarm, according to some implementations.

Like reference numbers and designations in the various drawings indicate like elements.

DETAILED DESCRIPTION

This disclosure relates to anomaly-sensing based multi-agent navigation. Multiple agents can integrate pre-surveyed anomaly field map, anomaly field sensing data, and relative distance or pose measurements between pairs of agents to aid navigation of the multiple agents, e.g., without GPS-aided navigation or at least without consistent GPS-aided navigation. Anomaly-sensing based multi-agent navigation for a cooperative network of agents can be achieved by matching distributed anomaly field sensor measurements to an anomaly field map and utilizing relative distance or pose measurements between pairs of agents to synthesize estimates of the global position of each agent.

Anomaly-sensing based multi-agent navigation can improve the absolute pose estimation of all agents in a dynamic swarm, compared to performance of the agents without network coordination. This can be achieved without relying on an external system such as landmark observations or GPS. Using a cooperative network, GPS-denied agents can receive updates to estimates of their absolute pose on the anomaly field map.

Figure 1:
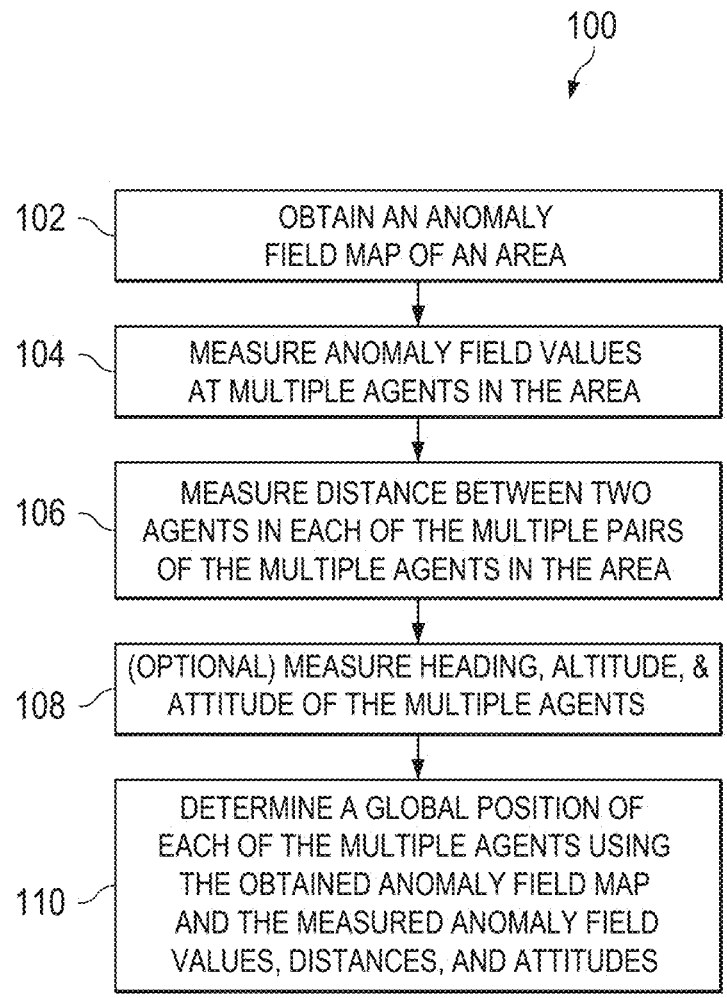
FIG. 1 illustrates an example process for anomaly-sensing based swarm navigation, according to some implementations.

FIG. 1 illustrates an example process 100 for anomaly-sensing based swarm navigation. For convenience, process 100 will be described as being performed by a computer system having one or more computers located in one or more locations and programmed appropriately in accordance with this specification. An example of the computer system is the computing system 900 illustrated in FIG. 9 and described later.

Figure 2B:
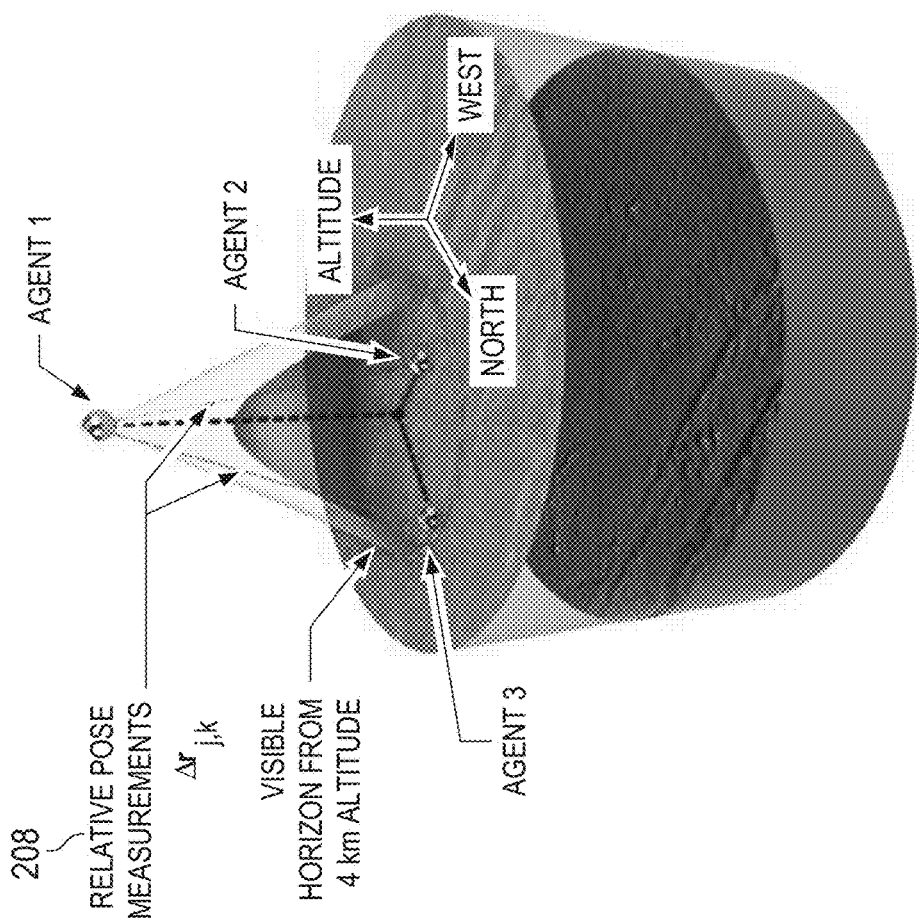
FIGS. 2A and 2B illustrate elementary components of anomaly-sensing swarm navigation, according to some implementations.
Figure 2A:
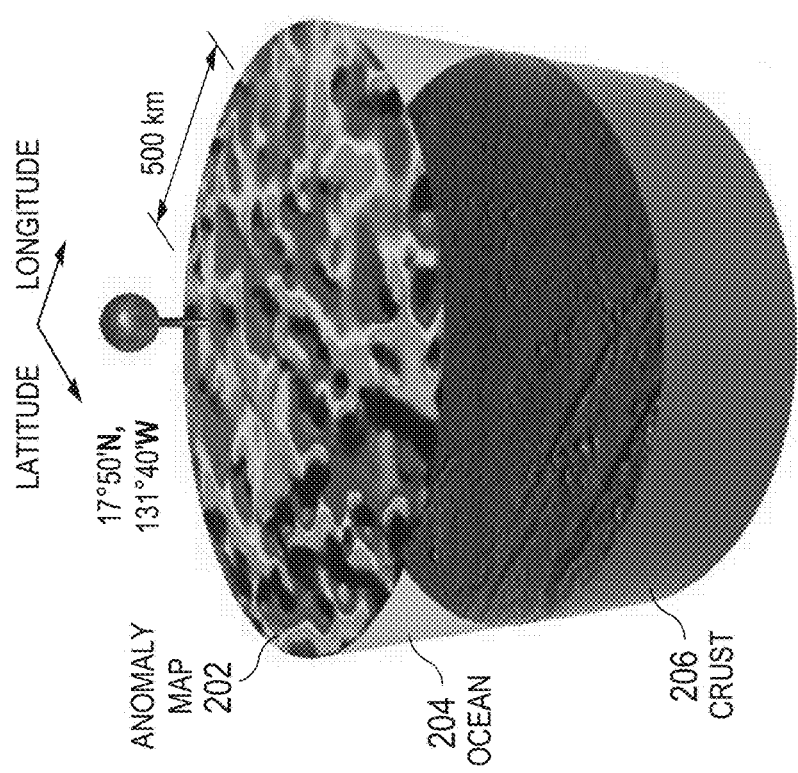

At a high level, process 100 can be described as follows. In steps 102 to 108, a computer system obtains an anomaly field map (e.g., a magnetic field map or a gravitational field map) of an area, measurement data of the field at multiple agents in the area, measurement data of distance between two agents in each of multiple pairs of agents of the multiple agents, and heading and attitude (i.e., pitch and roll) data of each of the multiple agents. At step 110, the computer system determines global position data of each of the multiple agents using the anomaly field map of the area, the anomaly field data, the distance data, and the heading and attitude data obtained in steps 102 to 108. An example anomaly field map is shown in FIG. 2A. Three example agents, together with their relative pose measurements 208, are shown in FIG. 2B. The multiple agents in the area can be collectively described as a swarm, and anomaly-sensing based swarm navigation refers to determining the global position of each of the multiple agents in the swarm in step 108 using the anomaly field map of the area, the anomaly field data, and the distance data obtained in steps 102 to 108.

More specifically, at step 102, a computer system obtains an anomaly field map of an area. Examples of an anomaly field map include a magnetic field map and a gravitational field map. FIGS. 2A and 2B illustrate elementary components of anomaly-sensing swarm navigation, including anomaly field map 202 in FIG. 2A. FIG. 2A shows an example section of Earth's crust 206 and Pacific Ocean 204 surface. The pre-surveyed magnetic anomaly map is overlaid, with coordination to latitude+longitude. This area includes approximately $10^6$ km$^2$ of surface. The ocean depth is approximately 5.3 km at this location. FIG. 2B shows an example anomaly-sensor swarm, composed of three agents, operating over the same area as in FIG. 2A. In FIG. 2B, Agent 1 is airborne at 4 km altitude. Within its horizon, Agent 1 has line-of-sight visibility to surface Agents 2 and 3. This visibility can enable relative pose measurements $\Delta r_{2,1}$ and $\Delta r_{3,1}$, which includes the distance between two agents in each pair of the three agents. Coastline landmarks cannot be sighted by the three agents at this map location.

Returning to FIG. 1, at step 104, the computer system receives anomaly field data at each of multiple agents in the area, which can be generated using e.g., magnetic or gravitational anomaly sensor subsystem onboard each of the multiple agents. The magnetic anomaly sensor can be a magnetometer such as: 1. a scalar optically pumped magnetometer (OPM) including an alkali vapor OPM, or 2. a vector atomic magnetometer including a nitrogen-vacancy diamond (NVD) sensor. The anomaly field sensor subsystem can consist of more than a field sensor. It can include auxiliary calibration sensors and a local calibration computer, to provide at specified time instants an estimate for the true local field, while mitigating platform interference to the measured anomaly field data.

At step 106, the computer system receives distance data between two agents in each of multiple pairs of agents of the multiple agents. In some implementations, distance data between two agents can be measured using time-of-flight (TOF) ranging devices. Many operational fleet types make use of time-stamped messaging protocols that enable TOF-based scalar relative distance measurements.

Optionally and in certain embodiments, at step 108, the computer system receives heading, altitude and attitude data of each agent of the multiple agents. In some implementations, the heading, altitude and attitude data can be provided by a system that uses acceleration and rotation data from one or more inertial measurement units (IMUs) onboard each of the multiple agents to generate the heading and attitude data, without use of GPS. The heading and attitude data of each agent form three-dimensional (3D) rotational vectors. Attitude (i.e., pitch and roll), altitude and heading can also be used by an agent to establish a local vector coordinate system for relative pose measurements between agents, and can be used to orient an agent to the anomaly field map obtained in step 102. In other embodiments, the system does not receive heading, altitude and attitude data or receives only one or two of heading, altitude and attitude data or receives heading, altitude and/or attitude data for only some of the agents.

An agent's rigid-body platform pose can be specified at time t by the combination of the platform's 3D angular orientation, which includes {heading(t), pitch(t), and roll(t)}, and its 3D vector location r(t). Altitude can be estimated without GPS by using anomaly aiding, yet this can become challenging because the anomaly field yields low spatial information for upward/downward transits. Altitude can also be measured by alternative means, for example, with a barometer or sea-floor ranging device. For agents on the ocean surface, altitude can be estimated by assumption.

Figure 7:
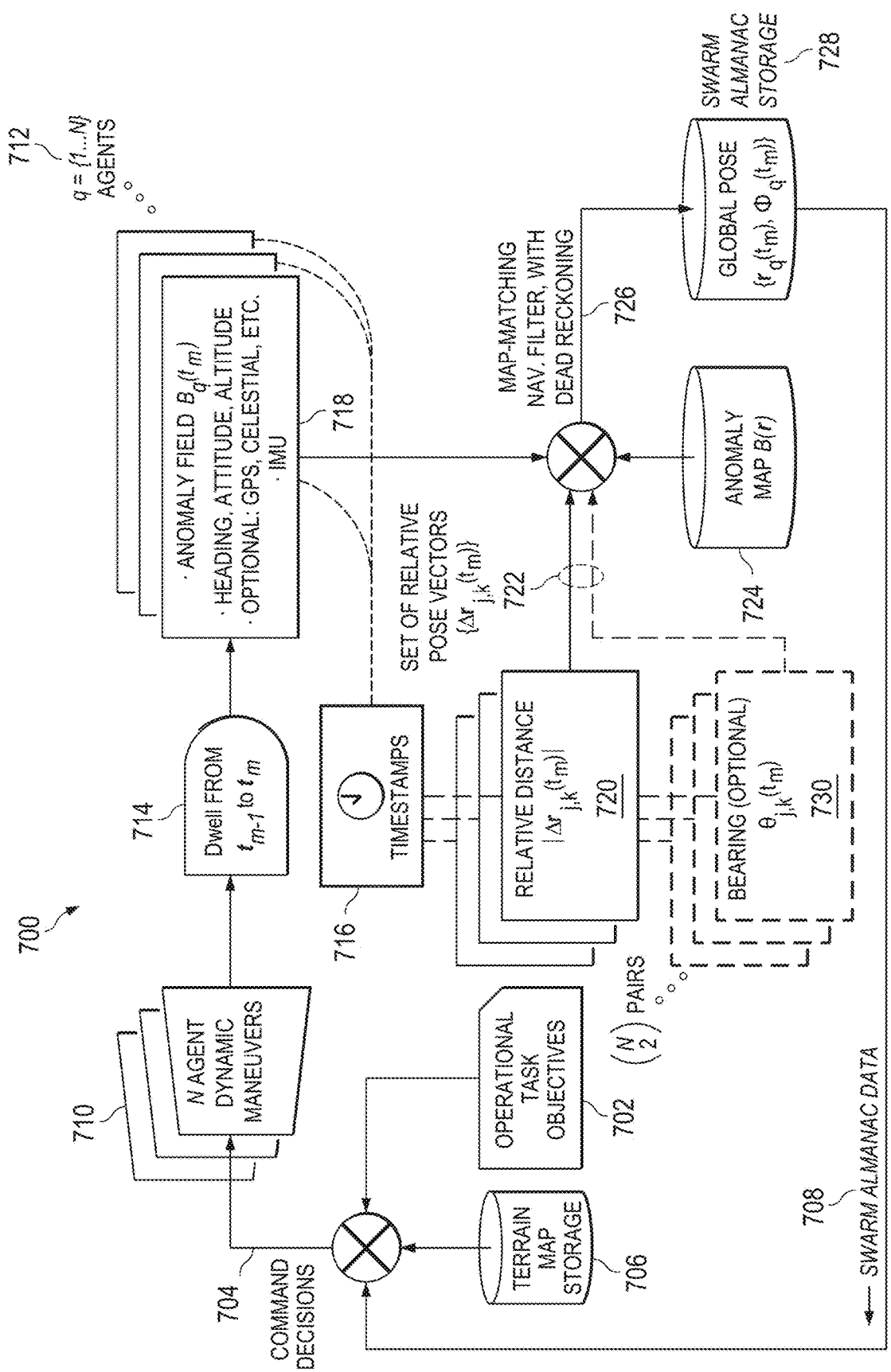
FIG. 7 illustrates an example of a navigation filter and its input and output data for anomaly-sensing based swarm navigation, according to some implementations.

At step 110, the computer system determines a global position of each, or at least some, of the multiple agents using the anomaly field map of the area, the anomaly field data, the distance data, and the heading and attitude data received in steps 102 to 108. This determination of the global position of an agent can be performed by a filter, for example, a navigation filter. An example navigation filter 726 is shown in FIG. 7. FIG. 7 illustrates an example 700 of a navigation filter and its input and output data for anomaly-sensing based swarm navigation. In some implementations, the multi-agent anomaly-sensing based swarm navigation includes map-matching of distributed mobile anomaly sensor data, constrained by time-stamped distance measurements between pairs of the distributed mobile platforms, as described below.

A navigation filter, e.g., navigation filter 726 can use the anomaly field map of the area retrieved from anomaly map storage 724, anomaly field data in data set 718, and distance data 720 as filter measurement input data to estimate global pose of the swarm. The navigation filter can reduce the errors in each of the multiple agents' global position, heading, and attitude (i.e., pitch and roll) that are estimated by the navigation filter based on the heading and attitude data received in step 108. More specifically, anomaly field data from an agent can be compared to anomaly field value from a location in the anomaly field map that corresponds to the location of the agent, and the difference from the comparison can be used to reduce the error in global position of each of the multiple agents estimated by the navigation filter. Additionally, the distance data between two agents in each of multiple pairs of agents of the multiple agents, measured by, for example, TOF ranging devices onboard the two agents, can also be used as filter measurement input data to reduce the error in each of the multiple agents' global position that is estimated by the navigation filter.

The navigation filter 726 can use the anomaly field map of the area, the anomaly field data, and the distance data as filter measurement input data for incremental steering updates to dead reckoning. In some implementations, the initial global position, heading, and attitude of each of the multiple agents can be initialized to a specified accuracy by some methods, at some point in the past. The steering updates can then aid the navigation filter during the loss of GPS.

In some implementations, once the anomaly field map-coordinated global position is estimated for each of the multiple agents in the swarm, the relative bearing angles between two agents in each pair of the multiple agents can be determined from the estimated global positions of the multiple agents.

In some implementations, at step 106, instead of receiving distance data between two agents in each of multiple pairs of agents of the multiple agents, the computer system can receive relative pose data between two agents in each of multiple pairs of agents of the multiple agents. This can further reduce the error in determined global position of each agent at step 110. Relative pose data is 3D displacement vector measurement time-series data between agents in pairs, denoted by, for example, $\Delta r_{j,k}(t)$ for the pair formed by two agents indexed as j and k. These vector measurements include two parts: relative scalar range $|\Delta r_{j,k}(t)|$ and bearing $\theta_{j,k}(t)$ between agents j,k in a pair. Bearing includes both angles that comprise relative orientation between two points: relative azimuth and relative angle of elevation/depression. Relative pose data can be provided by directed ranging equipment such as microwave ranging (MWR), or LIDAR/RADAR/SONAR.

In some implementations, an anomaly-aided swarm can accumulate navigation solutions by cooperative information sensing, storage, computational processing, and communication functions. FIG. 10 illustrates example functions of agents in an anomaly-aided swarm.

In some implementations, the anomaly-sensing based swarm navigation illustrated in FIG. 1 can include a look-up function that compares mobile anomaly sensor readings to the pre-surveyed anomaly field map. The pre-surveyed anomaly field map data can be stored on media with access speed for computation involved in anomaly-sensing based swarm navigation. The pre-surveyed anomaly field map data can also be updatable. Example map data updates include solar weather data, Simultaneous Localization and Mapping (SLAM) map data, new external survey data, periodic revisions of Earth's core field model data, or downward and upward continuation data to accommodate operating altitude of the agents.

In some implementations, a dead-reckoning navigation system, uses an operational map and anomaly aided steering updates, IMU data, and other information as available, to estimate and predict the pose of agent(s). Although the positional components of this pose estimate are also contained in the swarm almanac, operational agents may need additional capacity to compute and store their orientation, or compute other navigational (e.g., "terrain") aspects of their local situation for task completion.

In some implementations, the time-series set of 3D vector locations $\{r_q(t)\}$, indexed for agents q=1 .... N, is collectively described as the swarm almanac. A set of 3D vector locations with bearing can also be described as the global pose of the network. As noted above, the global pose can be determined based at least in part on absolute locations on the anomaly field map. The swarm almanac time-series can be stored in media for access by agent types who request the data.

In some implementations, the cooperative information sensing and processing functions of the multi-agent swarm include communication. Agent subtypes can be equipped with bidirectional communication capacity, with some exceptions. For example, some sensor drones do not need to receive transmissions. Their roles are to measure the anomaly field at its location and transmit that sensor data to the swarm. Such an agent's platform relative pose can be estimated by other agents in the swarm. In another example, a differentiated swarm system type can derive special utility from its sensor drone agent member(s) and therefore does not need to receive transmissions. In some implementations, in the case of an agent type that must not exhibit any overt or active communication signatures, the agent type does not need to transmit data. Passive operations agents can benefit from the anomaly-aided pseudolite signals. But they may not be fully cooperative members of the swarm. In another example, a differentiated swarm system type that derives special utility from deploying passive operations agents does not need to transmit data.

In some implementations, the underlying physical field of the anomaly field is a 3D vector field, denoted, for example, as B. This is the case for the magnetic anomaly field. Nonetheless, surveys of the magnetic anomaly field can be conducted with scalar sensors, which report the scalar magnitude $|B|$ of the anomaly field. The resultant anomaly maps are scalar anomaly maps $B(r)=|B(r)|$.

In some implementations, vector anomaly field maps $B(r)$ can be decomposed into three orthogonally oriented, coordinated scalar maps denoted by the set $\{B_x(r), B_y(r), B_z(r)\}$. Vector anomaly-aided swarms using 3D vector anomaly field maps can include agents equipped with vector anomaly sensors and orientation (i.e., heading and attitude) sensors. Each of the decomposed-by-component field map and sensor data can then be processed separately using the same methods that presume scalar anomaly field maps and scalar sensor data. The navigation computer, for example, navigation filter 726 in FIG. 7, can combine the separate results.

As shown in FIG. 10, the swarm prodigy agent type can include three distinct agent subtypes: the anomaly-aided pseudolite, the navigation computer, and the sensor drone. The collective functions of a swarm prodigy agent type are enabled by its composition of the subtypes, with intercommunication between the agents.

In some implementations, high-capacity communication equipment can compensate for removal of local storage and computation equipment from mobile agent platforms. This can be a cloud architecture for the navigation computer, which may be equipped at a stationary, remote location. The data and computations at the navigation computer can be accessed by the swarm, via communication capacity.

In some implementations, the navigation computer can be mobile and equipped on a large sensor size, weight, power, and cost (SWaP+C) mobile platform that accompanies the swarm, while not acting as a fully cooperative anomaly navigating member of the swarm.

In some implementations, communication equipment can accommodate swarm capabilities with functionally separated platforms.

In some implementations, swarm prodigy agents may be either self-contained mobile platforms or platforms with separated navigation storage and computation functions. These implementation choices do not affect the functional equivalence of the described swarm systems.

Figure 3A:
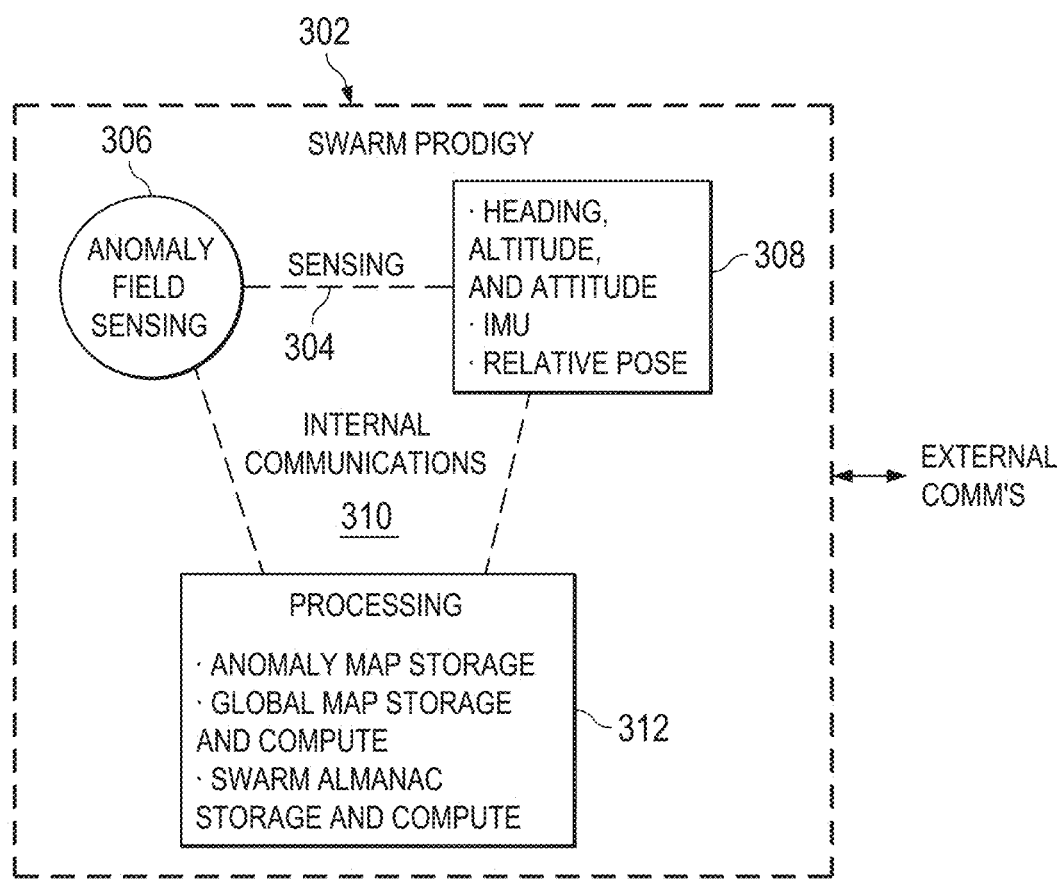
FIGS. 3A and 3B illustrate swarm prodigy functions shown in FIG. 10, according to some implementations.
Figure 3B:
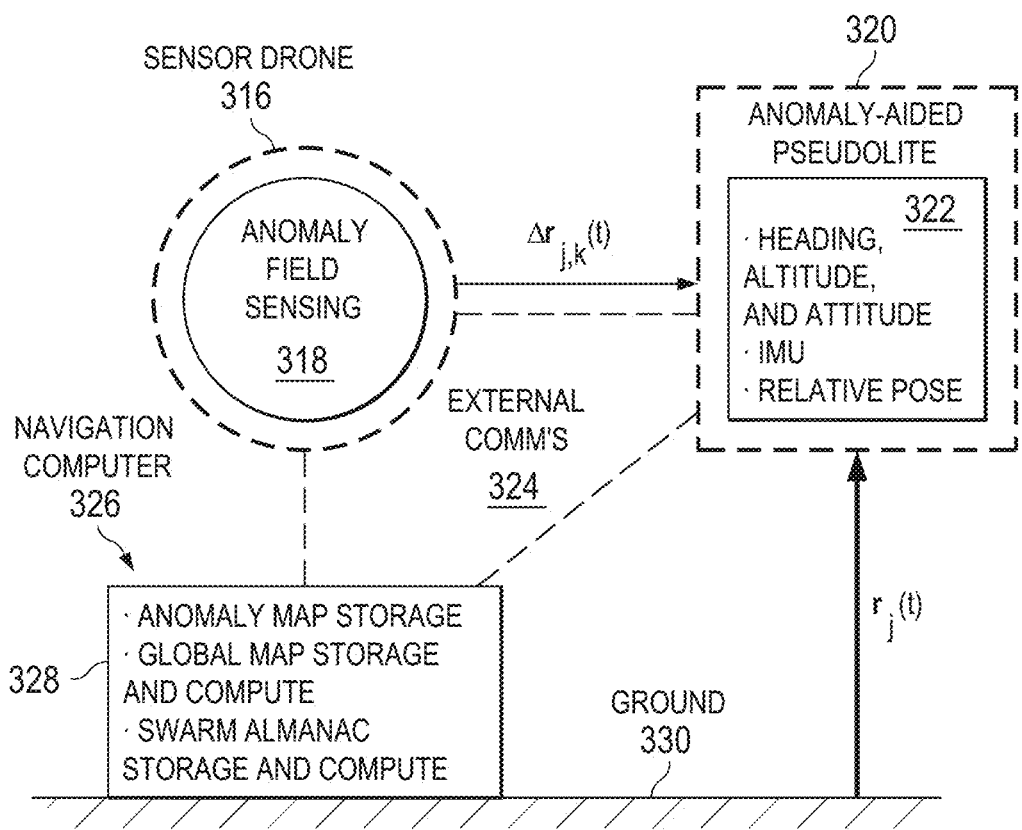

FIGS. 3A and 3B illustrate swarm prodigy functions shown in FIG. 10. Communication channels 310 and 324 are indicated by dashed lines. FIG. 3A shows functional composition of a self-contained prodigy mobile platform 302, with all capabilities according to FIG. 10. The illustrated swarm prodigy 302 includes sensing components 304 including anomaly field sensing 306 and 318, heading, altitude, attitude, IMU and relative pose determination 308 and 322, internal communications 310, processing 312 and 328 and external communications 324. FIG. 3B shows identical functions, distributed on two mobile agent subtypes: sensor drone 316 and anomaly-aided pseudolite 320, with cloud communication to the third (not necessarily mobile) subtype: navigation computer 326 on the ground 330. Solid arrows indicate the global pose of the pseudolite 320, and relative pose of the sensor drone 316.

A swarm type includes at least two agents. A cooperative mobile anomaly sensor swarm of size N requires a minimum of N−1 unique relative pose measurements or distance measurements between pairs, with every agent platform measured at least once.

In some implementations, a subset of partially-redundant relative pose or distance measurements, which go beyond the minimal set, can include some individual member agents that are already members of other pairs in the minimal set. The maximum possible number of unique relative pose measurements is (N choose 2). Optional measurements can increase accuracy of the network pose estimate. The subset size is (N choose 2)−(N−1)=(N−1 choose 2). This increases with increasing swarm size N. By including as many optional measurements as possible, larger swarms can attain correspondingly improved pose estimation accuracy than smaller swarms.

For example, for a single 3-agent swarm, there are two minimum measurements, and only one optional. For a cooperative 9-agent swarm, there are 8 required measurements, and 28 optional. Therefore, as an example, every agent in a fully-measured 9-agent swarm would inherit improved pose accuracy compared to any agent in three (disconnected) subset 3-agent swarms. This is because the optional measurement set size is much larger in the connected case.

Figure 4A:
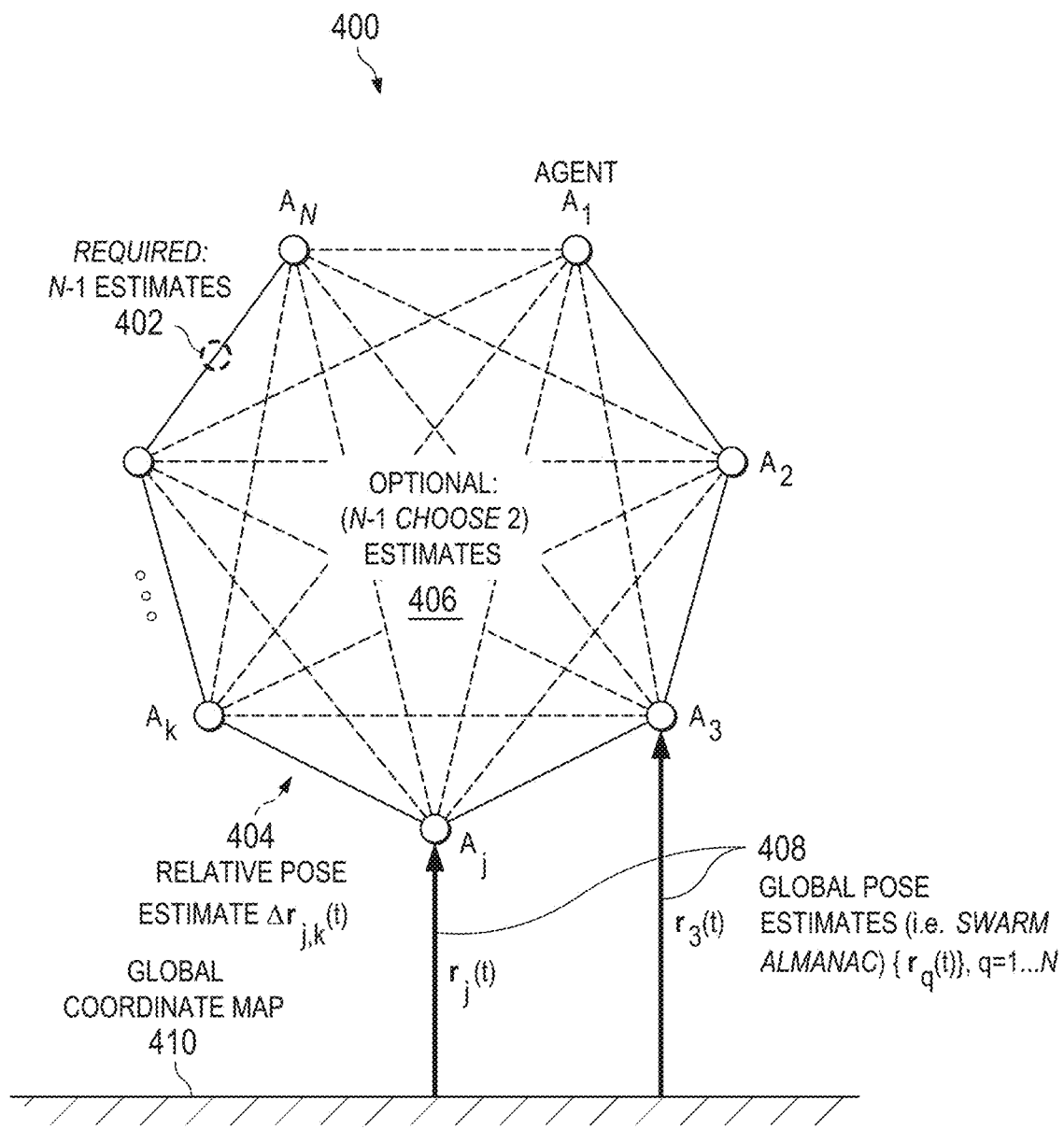
FIG. 4A illustrates composition and nomenclature for an N-agent swarm, according to some implementations.

FIG. 4A illustrates composition and nomenclature for an N-agent swarm 400. FIG. 4A illustrates both the required N−1 unique relative pose estimates 402 and the optional (N−1 chose 2) 406. FIG. 4B illustrates a square-root performance scaling model for relative pose inaccuracy, based on the size of the optional pose measurement set, with uncorrelated relative pose or distance measurements. FIG. 4A also shows global pose estimates 408 (i.e., swarm almanac) and global coordinate map 410. No anomaly measurements or map-matching functions are taken into account in FIG. 4B.

In some implementations, a swarm with multiple agents can be described as a homogenous swarm when it is composed of two or more identical agents of the swarm prodigy type. Any agent or agents in a homogeneous swarm may perform any or all of the information storage, communication, and computation functions required collectively for the network. All agents are equipped to measure the anomaly field at their location. Every agent is further equipped to navigate by dead reckoning, with anomaly aided updates to its own and other agents' global pose estimate(s). A homogenous swarm that satisfies the above pose measurement requirements, and which acquires all N possible anomaly field measurement time-series, can be described as a fully cooperative swarm.

In some implementations, homogenous swarm type can provide flexibility to goal planners, who may assign tasks to the swarm without concern for individual agent capabilities. When deploying subsets of a fleet as operational swarms, provisioning agents from an identical fleet furthermore provides for task-assignment redundancy as any task may be attempted by any agent(s), and agent replacement capacity.

In some implementations, a homogeneous swarm can conduct autonomous flocking operations in GPS-denied areas. "Flocking" describes that the individual agent courses and specific objectives are not fully planned in advance, but are instead defined by cooperative updates during the operation. These updates can include emergent information from trajectories of other agents in the swarm, as well as progress towards objectives and unforeseen impediments.

In some implementations, flocking algorithms can be more efficient to compute for collective agents with identical capabilities. Therefore, a homogeneous swarm type can enable higher-speed dynamics and larger flock numbers than a similarly equipped swarm with differentiated agents.

In some implementations, in a cold-start scenario, a multi-agent swarm does not yet have IMU data to steer an ongoing navigation solution. Without GPS or landmark observation, the initial pose estimation problem is challenging. Multi-agent anomaly-aided map-matching can be used to provide a cold-start initial estimation of global position for each agent in the swarm, at a notional starting time to.

As an example, Table 1 below shows initial representative values of measurement data from GPS-free sensors for cold-start in anomaly-sensing based swarm navigation of the three agents in FIG. 2B over the Pacific Ocean surface shown in FIG. 2A. Data in Table 1 can be acquired without GPS or terrain feature identification.

TABLE 1

| GPS-free sensor type (examples) | Measurement type | Agent 2 (⬠) | Agent 1 (◯) | Agent 3 (◇) |
|---|---|---|---|---|
| Magnetometer | Anomaly field | 10 ± 5 nT | −25 ± 10 nT | 95 ± 10 nT |
| Anomaly map | Map-matching (See FIG. 2A and FIG. 5) | ⬠ | ◯ | ◇ |
| Magnetic compass, celestial imaging | Heading | — | 0° (i.e. North) | — |
| Horizon sighting, tip/tilt acceleration. | Attitude | — | 0° pitch, 0° roll (i.e. level) | — |
| Barometer, LIDAR | Altitude (MSL) | 0 m (i.e. surface) | 4 km | 0 m (i.e. surface) |
| LIDAR, TOF inference | Relative vector pose w.r.t. $A_1$ (East, North, Altitude) | $\Delta r_{2,1}$ = (−98, 0, −4) km | | $\Delta r_{3,1}$ = (0, 217, −4) km |

Based on the sensor measurement data information in Table 1, the computational step of cold-start in anomaly-sensing based swarm navigation can be performed to estimate the global position of each of the three agents. This example uses stepwise n-particle joint filters on the map section near latitude/longitude (17°50'N, 131°40'W).

Table 2 shows the global positioning areal uncertainty per agent. When compared to independent-agent (1-particle) anomaly-aided navigation, the joint information provided by multiple agents sampling the anomaly field on long baselines significantly reduces the positioning uncertainty. As shown in Table 2, all three agents inherit the same final uncertainty, even though Agent 1 is transiting a substantially featureless area of the anomaly field map.

TABLE 2

| Multi-agent map matching step # | Description | Global positioning areal uncertainty, per agent | | |
|---|---|---|---|---|
| | | ⬠ Agent 2 | ○ Agent 1 | ⬦ Agent 3 |
| 1 | Unfiltered circular map: 1,128 km dia. | | $1 \times 10^6$ km² | |
| 2 | 1-particle filter | 44,100 km² | 55,225 km² | 3,564 km² |
| 3 | Joint 2-particle filter | 2,254 km² | 1,149 km² | |
| 4 | Joint 3-particle filter | | $(9.4 \text{ km})^2 = 88$ km² | |

Figure 5:
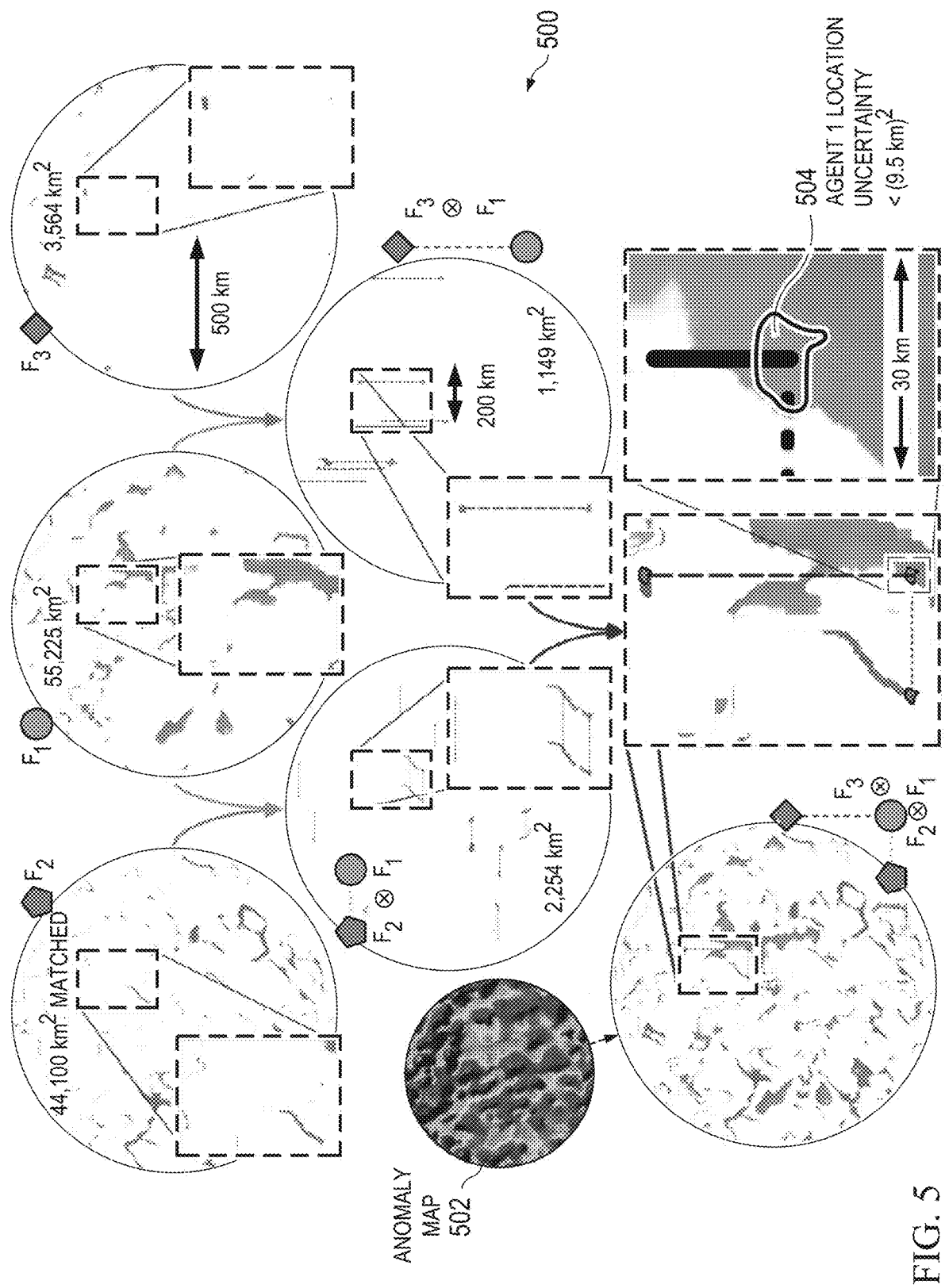
FIG. 5 illustrates a cold-start example of multi-agent anomaly map-matching applied to the example map from FIG. 2A, according to some implementations.

FIG. 5 illustrates a cold-start filter example 500 of multi-agent anomaly map-matching applied to the example map from FIG. 2A using the agents from FIG. 2B. Agent 1 in FIG. 2B (labeled F1 in FIG. 5) is the agent up in the air in FIG. 2B that has line of sight to agents 2 and 3 in FIG. 2B (labeled F2 and F3, respectively, in FIG. 5). With reference to FIG. 5, in example 500, there is no terrain in sight near this Pacific Ocean location. Subplots in the top row show the results from single-particle filters for each of the three agents (F1, F2, and F3 in FIG. 5 and agents 1, 2 and 3 in FIG. 2B). Each agent makes a magnetic field measurement. Once the agents make their measurement, the system searches for portions of the magnetic field map that match the measured value. Instead of showing the number of nanoTesla (nT) measure by each agent and reflected in Table 1 above, each map associated with each agent in the top row of FIG. 5 simply shows the regions that have the magnetic field value measured by that agent, i.e., all the areas of the map that match the specified nT reading with the specified uncertainty. Agent F1 has quite a large area (55,225 square km) that matches the F1 nT setting, agent F2 has a slightly smaller area (44,100 square km) that matches the F2 nT setting and agent F3 has the smallest area ((3,564 square km) of the three agents. Subplots in the middle row of FIG. 5 show the results from joint 2-particle filters, which combine relative pose and anomaly field measurements. In other words, the system determines, constraint F1×F2, where the swarm could be to take into account the joint constraint such that agent 1's magnetic field measurement is true and agent 2's magnetic field measurement is true and the relative pose of agent 1 and agent 2 is true (perhaps a dozen possible locations). Similarly, the system determines, constraint F1×F3, where the swarm could be to take into account the joint constraint such that agent 1's magnetic field measurement is true and agent 3's magnetic field measurement is true and the relative pose of agent 1 and agent 3 is true (perhaps a half dozen locations). Subplots in the bottom row of FIG. 5 show results from joint 3-particle filter, resulting in unique location estimates for each of the three agents in FIG. 2B. Now the system searches for spots that meet both constraint F1×F2 and F1×F3. Here one can see the performance enhancement where the location is determined accurately, with uncertainty, e.g., agent 1 location uncertainty 504, less than 9.5 square km. FIG. 5 shows anomaly map 502. Furthermore, the performance can be much better than this illustrative example.

Figure 6:
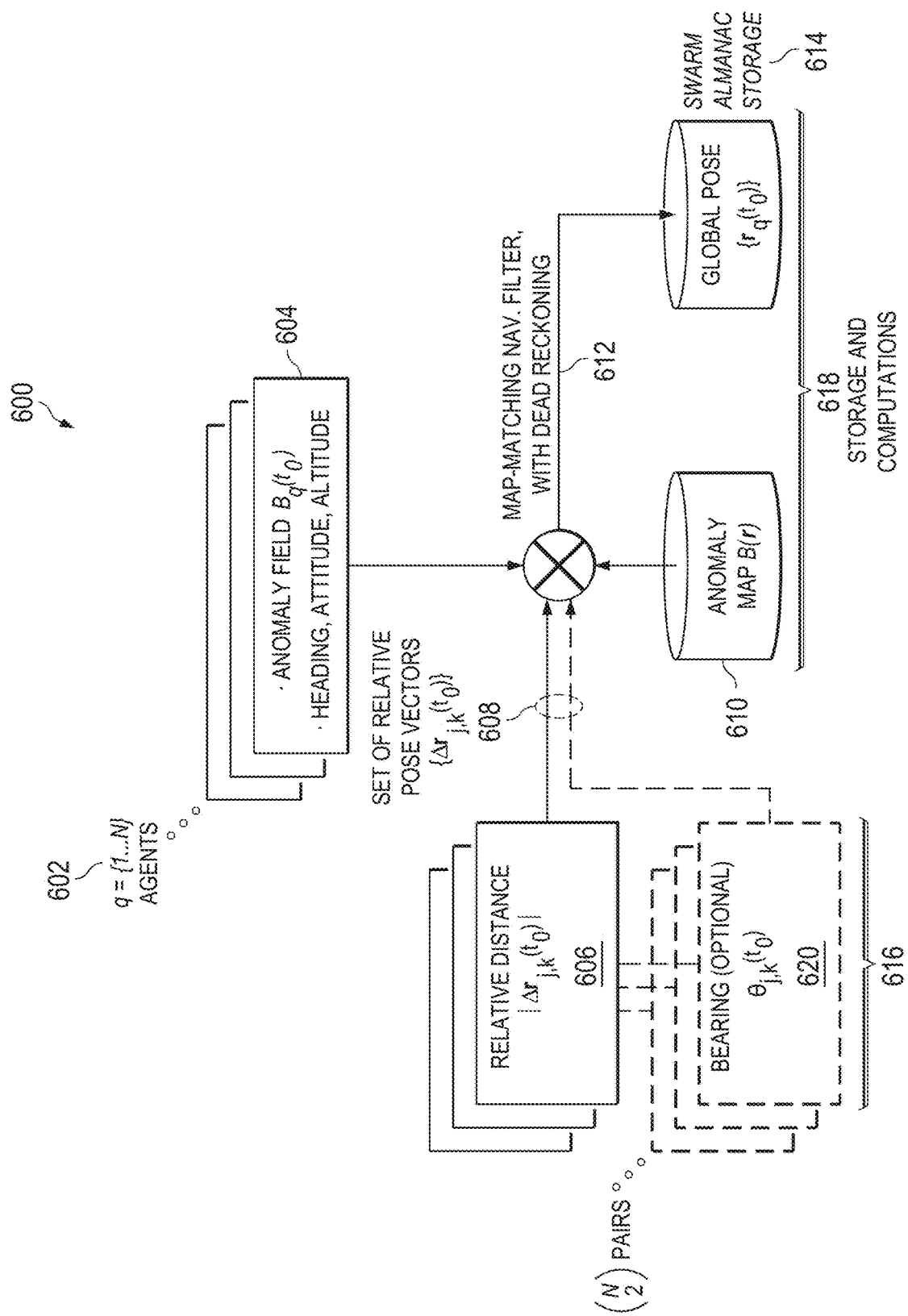
FIG. 6 illustrates an example of the information flow for a map-matching based cold-start of a multi-agent swarm, according to some implementations.

FIG. 6 illustrates an example 600 of the information flow for a map-matching navigation filter with dead reckoning that can be used to perform cold-start navigation of a multi-agent swarm. Anomaly map-matching can be used to provide a cold-start initial estimation of global pose for each agent in the swarm, at a notional starting time to. Similar to FIG. 7 described earlier, the map-matching navigation filter 612 can use the anomaly field map of the area retrieved from anomaly map storage 610, the anomaly field data and heading attitude and altitude for each of a set of agents 602 in data set 604, and the relative distance data 606 as filter measurement input data to estimate global pose which can be stored in swarm almanac storage 614. The anomaly map storage 610 and the swarm almanac storage are part of storage and computations 618. The filter can use bearing information 620 in combination with relative distance data 606 to produce a set of relative pose vectors 608 and can use the combination of the bearing data 620 and relative distance data 606, collectively measurements 616, to reduce errors in each of the multiple agents' global position, that is estimated by the navigation filter.

As noted above, FIG. 7 illustrates a navigation system including a navigation filter, e.g., navigation filter 726, that can use the anomaly field map of an area retrieved from anomaly map storage 724, anomaly field data in data set 718, and distance data 720 in the form of a set of relative pose vectors 722 as filter measurement input data to estimate global pose of the swarm, which can be stored in swarm almanac storage 728. Optionally, the filter can use bearing information 730 in combination with relative distance data 720 to produce a set of relative pose vectors 722. More specifically, anomaly field data from an agent can be compared to anomaly field value from a location in the anomaly field map that corresponds to the location of the agent, and the difference from the comparison can be used to reduce the error in global position of each of the multiple agents estimated by the navigation filter. Additionally, the distance data between two agents in each of multiple pairs of agents of the multiple agents, measured by, for example, TOF ranging devices onboard the two agents, can also be used as filter measurement input data to reduce the error in each of the multiple agents' global position that is estimated by the navigation filter.

The global pose data/swarm almanac data 708 can be provided as input along with operational task objectives 702 and terrain map data 706 to a decisions engine 704. The decisions engine 704 can then provide dynamic maneuvers instructions 710 to at least some of the agents. After some period of time 714 the process starts again. In order to ensure the system is syncing various measurements for various agents 712, e.g., anomaly measurements by agents and pose measurements of those same agents, the system 700 applies time stamps 716 during various measurements.

Figure 8:
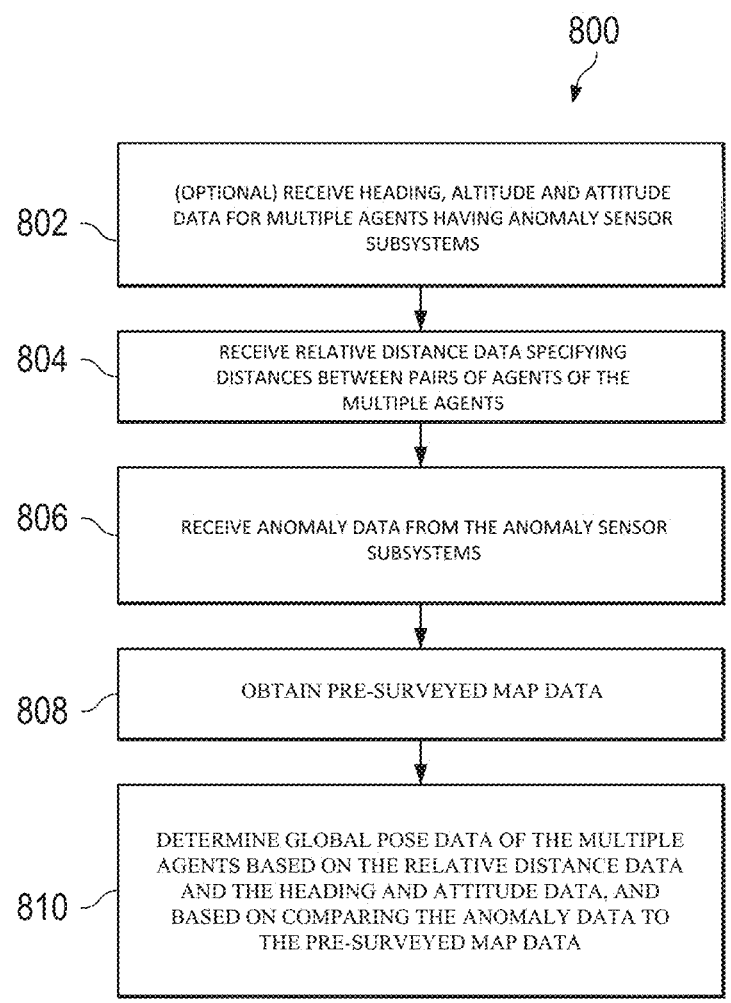
FIG. 8 illustrates an example process for anomaly-sensing based swarm navigation, according to some implementations.

FIG. 8 illustrates an example process 800 for anomaly-sensing based multi-agent navigation. The process includes: (optionally) receiving 802 heading, altitude and attitude data for one or more agents, each such agent having an anomaly sensor subsystem; receiving 804 relative distance data specifying distance between at least one pair of agents of a plurality of agents, each of a subset of the plurality of agents having an anomaly sensor subsystem; receiving 806 anomaly data from at least one anomaly sensor subsystem of one of the plurality of agents; obtaining 808 pre-surveyed map data; and determining 810 global pose data of the plurality of agents based on the relative distance data and based on comparing the anomaly data to the pre-surveyed map data.

Figure 9:
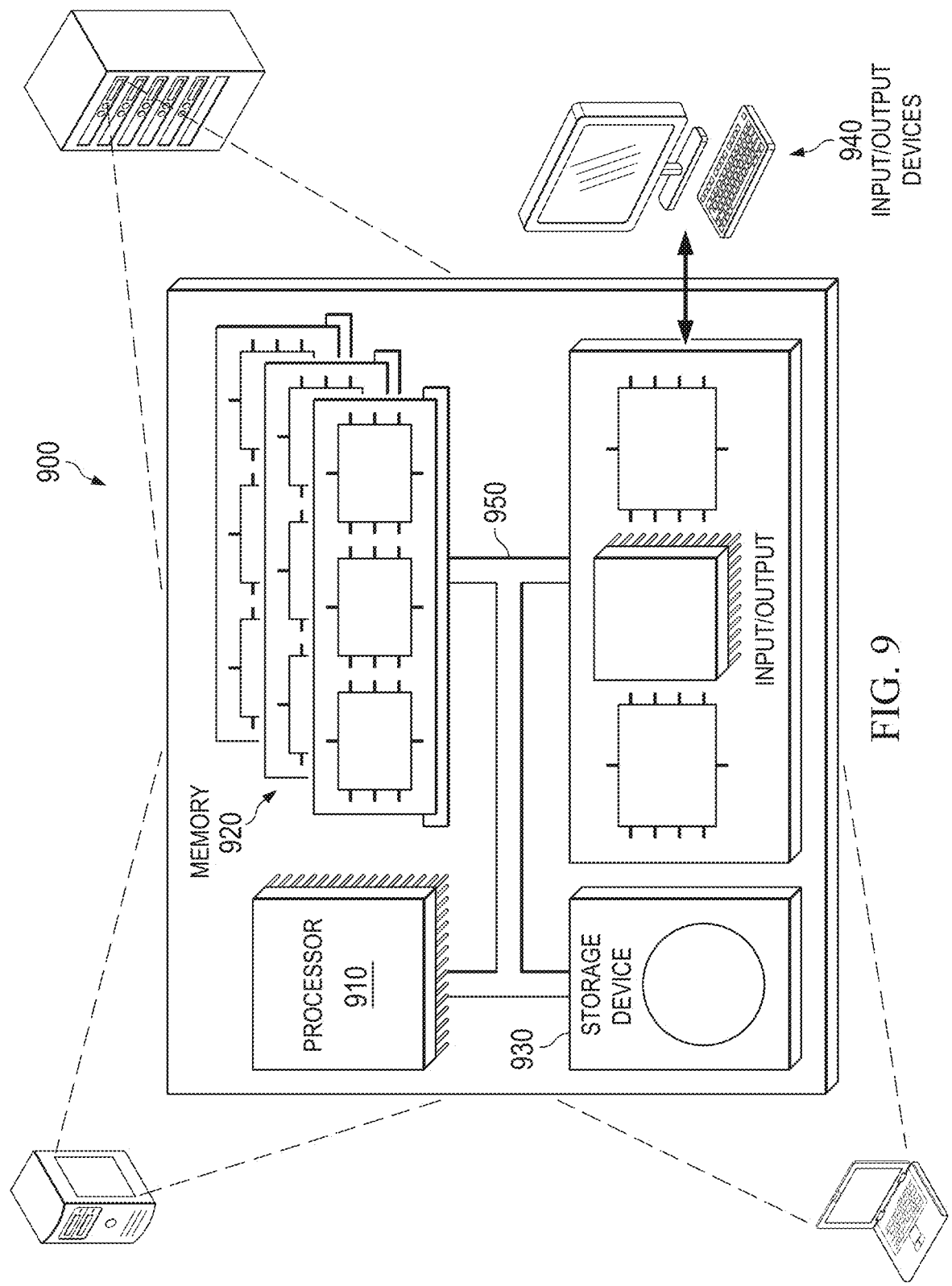
FIG. 9 is a schematic illustration of example computer systems that can be used to execute implementations of the present disclosure.

FIG. 9 illustrates a schematic diagram of an example computing system 900. The system 900 can be used for the operations described in association with the implementations described herein. For example, the system 900 may be included in the computer system discussed herein. The system 900 includes a processor 910, a memory 920, a storage device 930, and an input/output device 940. The components 910, 920, 930, and 940 are interconnected using a system bus 950. The processor 910 is capable of processing instructions for execution within the system 900. In some implementations, the processor 910 is a single-threaded processor. The processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. The memory 920 is a volatile memory unit. The memory 920 is a non-volatile memory unit. The storage device 930 is capable of providing mass storage for the system 900. The storage device 930 is a computer-readable medium. The storage device 930 may be a floppy disk device, a hard disk device, an optical disk device, or a tape device. The input/output device 940 provides input/output operations for the system 900. The input/output device 940 includes a keyboard and/or pointing device. The input/output device 940 includes a display unit for displaying graphical user interfaces.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

We claim:

1. A method, comprising:
   for each of a plurality of pairs of agents formed from a plurality of agents, receiving relative distance data specifying distance between the pair of agents formed from the plurality of agents, each of a subset of the plurality of agents having an anomaly sensor subsystem;
   determining relative pose data between each pair of agents of the plurality of pairs of agents based at least in part on the relative distance data between each pair of agents of the plurality of pairs of agents;
   receiving, at a navigation computer, anomaly data from at least the anomaly sensor subsystem of one of the subset of the plurality of agents;
   obtaining, at the navigation computer, pre-surveyed map data;
   determining, at the navigation computer, global pose data of the plurality of agents based at least in part on the relative pose data and based on comparing the anomaly data to the pre-surveyed map data;
   providing the global pose data as input, along with operational task objectives and terrain map data to a decisions engine;
   providing, by the decisions engine, dynamic maneuvering instructions to at least some of the plurality of agents; and
   navigating the at least some of the plurality of agents based at least in part on the determined global pose data of the plurality of agents, wherein the at least some of the plurality of agents comprise passive operations agents that do not transmit data, each of the passive operations agents receives relative distance data between the passive operations agent and one or more pseudolites, and the plurality of agents do not include the one or more pseudolites.

2. The method of claim 1, wherein the method further comprises using a map-matching navigation filter to perform cold-start navigation of the plurality of agents, the cold-start navigation initially establishing navigation unaided by GPS data or landmark observation.

3. The method of claim 1, wherein determining the global pose data of the plurality of agents comprises determining a difference between the pre-surveyed map data and the anomaly data at a location of each of the plurality of agents.

4. The method of claim 1, wherein determining the global pose data of the plurality of agents comprises receiving heading and attitude data for the subset of the plurality of agents having the anomaly sensor subsystems.

5. The method of claim 1, wherein determining the global pose data of the plurality of agents based on the relative pose data and based on comparing the anomaly data to the pre-surveyed map data comprises determining positions that meet at least one joint constraint that each agent anomaly sensor measurement and that the relative distance data or the relative pose data of the subset of the plurality of agents measuring anomalies are measured within a specified accuracy.

6. The method of claim 1, wherein receiving the anomaly data comprises receiving magnetic field anomaly data measured using at least one magnetometer.

7. The method of claim 1, wherein receiving the anomaly data comprises receiving gravitational field anomaly data measured using at least one gravimeter or at least one gravity gradiometer.

8. The method of claim 1, wherein the relative distance data is measured using a ranging device.

9. The method of claim 8, wherein the ranging device comprises at least one LIDAR or at least one SONAR or at least one RADAR or at least one microwave ranging device or a combination of them.

10. The method of claim 1, wherein the relative distance data is measured using time of flight analysis.

11. The method of claim 1, wherein the method further comprises receiving inertial measurement data from an inertial measurement unit on at least one agent in the plurality of agents and performing dead reckoning based in part on the inertial measurement data.

12. The method of claim 1, wherein the method further comprises receiving vector sensing data from at least one vector sensor on at least one agent in the plurality of agents.

13. A system, comprising:
   one or more computers and one or more storage devices on which are stored instructions that are operable, when executed by the one or more computers, to cause the one or more computers to perform operations comprising:

for each of a plurality of pairs of agents formed from a plurality of agents, receiving relative distance data specifying distance between the pair of agents formed from the plurality of agents, each of a subset of the plurality of agents having an anomaly sensor subsystem;

determining relative pose data between each pair of agents of the plurality of pairs of agents based at least in part on the relative distance data between each pair of agents of the plurality of pairs of agents;

receiving anomaly data from at least the anomaly sensor subsystem of one of the subset of the plurality of agents;

obtaining pre-surveyed map data;

determining global pose data of the plurality of agents based at least in part on the relative pose data and based on comparing the anomaly data to the pre-surveyed map data;

providing the global pose data as input, along with operational task objectives and terrain map data to a decisions engine;

providing, by the decisions engine, dynamic maneuvering instructions to at least some of the plurality of agents; and navigating the at least some of the plurality of agents, based at least in part on the determined global pose data of the plurality of agents, wherein the at least some of the plurality of agents comprise passive operations agents that do not transmit data, each of the passive operations agents receives relative distance data between the passive operations agent and one or more pseudolites, and the plurality of agents do not include the one or more pseudolites.

14. The system of claim 13, wherein the operations further comprise using a map-matching navigation filter to perform cold-start navigation of the plurality of agents, the cold-start navigation initially establishing navigation unaided by GPS data or landmark observation.

15. The system of claim 13, wherein determining the global pose data of the plurality of agents comprises receiving heading and attitude data for the subset of the plurality of agents having the anomaly sensor subsystems.

16. The system of claim 13, wherein determining the global pose data of the plurality of agents based on the relative pose data and based on comparing the anomaly data to the pre-surveyed map data comprises determining positions that meet at least one joint constraint that each agent anomaly sensor measurement and that the relative distance data or the relative pose data of the subset of the plurality of agents measuring anomalies are measured within a specified accuracy.

17. The system of claim 13, wherein receiving the anomaly data comprises receiving magnetic field anomaly data measured using at least one magnetometer.

18. One or more non-transitory computer-readable storage media encoded with instructions that, when executed by one or more computers, cause the one or more computers to perform operations comprising:

for each of a plurality of pairs of agents formed from a plurality of agents, receiving relative distance data specifying distance between the pair of agents formed from the plurality of agents, each of a subset of the plurality of agents having an anomaly sensor subsystem;

determining relative pose data between each pair of agents of the plurality of pairs of agents based at least in part on the relative distance data between each pair of agents of the plurality of pairs of agents;

receiving anomaly data from at least the anomaly sensor subsystem of one of the subset of the plurality of agents;

obtaining pre-surveyed map data;

determining global pose data of the plurality of agents based at least in part on the relative pose data and based on comparing the anomaly data to the pre-surveyed map data;

providing the global pose data as input, along with operational task objectives and terrain map data to a decisions engine;

providing, by the decisions engine, dynamic maneuvering instructions to at least some of the plurality of agents; and navigating the at least some of the plurality of agents, based at least in part on the determined global pose data of the plurality of agents, wherein the at least some of the plurality of agents comprise passive operations agents that do not transmit data, each of the passive operations agents receives relative distance data between the passive operations agent and one or more pseudolites, and the plurality of agents do not include the one or more pseudolites.

* * * * *